US012324079B2

(12) United States Patent
Viroli et al.

(10) Patent No.: US 12,324,079 B2
(45) Date of Patent: Jun. 3, 2025

(54) HOUSEHOLD COOKING HOB

(71) Applicant: ELECTROLUX APPLIANCES AKTIEBOLAG, Stockholm (SE)

(72) Inventors: Alex Viroli, Forli (IT); Laurent Jeanneteau, Compiègne (FR)

(73) Assignee: Electrolux Appliances Aktibolag, Stockholm (SE)

( * ) Notice: Subject to any disclaimer, the term of this patent is extended or adjusted under 35 U.S.C. 154(b) by 1160 days.

(21) Appl. No.: 17/264,958

(22) PCT Filed: Jul. 29, 2019

(86) PCT No.: PCT/EP2019/070306
§ 371 (c)(1),
(2) Date: Feb. 1, 2021

(87) PCT Pub. No.: WO2020/030457
PCT Pub. Date: Feb. 13, 2020

(65) Prior Publication Data

US 2021/0315064 A1 Oct. 7, 2021

(30) Foreign Application Priority Data

Aug. 6, 2018 (EP) .................................... 18187415

(51) Int. Cl.
*H05B 6/06* (2006.01)

(52) U.S. Cl.
CPC ......... *H05B 6/062* (2013.01); *H05B 2213/07* (2013.01)

(58) Field of Classification Search
CPC ............................ H05B 6/062; H05B 2213/07
See application file for complete search history.

(56) References Cited

U.S. PATENT DOCUMENTS

2007/0278216 A1* 12/2007 Tominaga .............. H05B 6/062 219/627

FOREIGN PATENT DOCUMENTS

| | | |
|---|---|---|
| DE | 19617319 | 10/1997 |
| JP | 2003317919 | 11/2003 |
| WO | 2003007660 | 1/2003 |
| WO | 2013118027 | 8/2013 |

OTHER PUBLICATIONS

International Search Report and Written Opinion for PCT/EP2019/070306, dated Oct. 18, 2019, 9 pages.

* cited by examiner

*Primary Examiner* — Dana Ross
*Assistant Examiner* — Kuangyue Chen
(74) *Attorney, Agent, or Firm* — Chrisman Gallo Tochtrop LLC

(57) ABSTRACT

The invention relates to a household cooking hob, particularly to an induction heating hob comprising a cooking surface (2) and a heating power transferring element, particularly an inductor or induction coil (3) preferably provided below the cooking surface (2), wherein at least two sensor elements (4) are distributed in an area covered by the heating power transferring element (3), the sensor elements (4) being configured to gather information regarding the temperature of a piece of cookware placed on the cooking surface (2), wherein an electrical circuit (5) is provided which comprises switching means (5.1) for providing a selective electrical coupling of one of said sensor elements (4) with a control entity (6).

18 Claims, 1 Drawing Sheet

HOUSEHOLD COOKING HOB

The present invention relates generally to the field of cooking hobs, in particular household or domestic cooking hobs. More specifically, the present invention relates to a cooking hob comprising multiple spatially distributed sensor elements for controlling the operation of the cooking hob.

BACKGROUND OF THE INVENTION

Cooking hobs, particularly induction hobs, per se, are known in the prior art.

Document JP 2003317919 A discloses an induction heating cooking device. The induction heating cooking device comprises a plurality of temperature detecting parts.

Disadvantageously, known cooking hobs comprise a complex circuitry for controlling the cooking process based on a plurality of temperature detecting parts.

SUMMARY OF THE INVENTION

It is an objective of the embodiments of the invention to provide a cooking hob with reduced technical effort which can therefore be manufactured with reduced costs. If not explicitly indicated otherwise, embodiments of the invention can be freely combined with each other.

According to an aspect, the invention refers to a cooking hob, in particular a household or domestic cooking hob, particularly to an induction cooking hob. The hob comprises a cooking surface and a heating power transferring element, particularly an induction coil preferably provided below the cooking surface. At least two sensor elements are distributed in an area covered by the heating power transferring element. The sensor elements are configured to gather information regarding the temperature of a piece of cookware placed on the cooking surface. An electrical circuit is provided which comprises switching means for providing a selective electrical coupling of one of said sensor elements with a control entity.

Said appliance is advantageous because temperature information provided by multiple sensor elements can be monitored with reduced technical effort and with reduced costs by selectively scanning the signals provided by the sensor elements and forwarding said signals to a control entity processing said signals.

According to an embodiment, the electrical circuit provides a selective electrical coupling of one of said sensor elements with a single input of a control entity. By using said selective electrical coupling, a technically simple control entity with a single input port can be used for receiving said temperature information.

According to an embodiment, the single input of the control entity is an A/D-converter input of the control entity. Thereby the temperature information received at the input port can be transformed from analog domain into digital domain in order to be able to process digital temperature information within the control entity.

According to an embodiment, the control entity is adapted to provide control information to the electrical circuit in order to control which sensor element is electrically coupled with the control entity. More in detail, said control information cause a certain switching behaviour of said switching means thereby influencing which sensor element is coupled with the control entity at a certain point of time. Advantageously, the control entity can control the switching behaviour and therefore the usage of temperature information of different sensor elements.

According to an embodiment, the control entity is configured to calculate control information based on information provided by at least two sensor elements. For example, the control information may be obtained by calculating an average value of temperature information provided by two or more sensor elements. Said average value may be obtained by an unweighted averaging or a weighted averaging. Thereby it is possible to determine a mean temperature value of a piece of cookware placed above the induction coil (in case of an uneven heat distribution).

According to an embodiment, the electrical circuit is configured to adjust the voltage provided by the sensor elements to the voltage level required by the control entity. So, the electrical circuit may comprise a conditioning circuit portion, said conditioning circuit portion being adapted, for example, to adapt the signal level of the electrical signal provided by the sensor element (e.g. voltage level adjustment).

According to an embodiment, said switching means comprise an electromechanical switch, a transistor and/or a multiplexer for providing said selective electrical coupling of one of said sensor elements with the control entity.

According to a further aspect, the invention relates to a method for controlling a household cooking hob, particularly an induction heating appliance. The hob comprises a heating power transferring element, particularly an induction coil provided below the cooking surface and two or more sensor elements arranged below the cooking surface and associated with the heating power transferring element. The method comprises the steps of:

- gathering temperature information by said sensor elements;
- selectively coupling one of said sensor elements with a control entity in order to provide gathered temperature information to said control entity; and
- controlling the induction heating appliance based on gathered temperature information.

According to an embodiment, the step of selectively coupling one of said sensor elements with a control entity comprises electrically coupling a first sensor element with the control entity, performing a switching operation thereby decoupling the first sensor element from the control entity and coupling a second sensor element with the control entity. Thereby it is possible to consecutively sample multiple sensor elements and process the information provided by said sensor elements. In addition, buffering of received information may be performed by the control entity in order to temporarily store received information.

According to an embodiment, the step of selectively coupling one of said sensor elements with a control entity comprises consecutively coupling different sensor elements to a single electrical input of the control entity. Despite using multiple sensor elements, a control entity with a single input for receiving information of said sensor elements can be used.

According to an embodiment, the control entity controls the selective electrical coupling of one of the sensor elements with the control entity. Thereby it is possible for the control entity to take influence on the selection of sensor elements.

According to an embodiment, the control entity receives temperature information from multiple different sensor elements and calculates control information based on said multiple temperature information. Thereby a more sophisticated processing (averaging, weighted averaging etc.) of temperature information is possible.

According to an embodiment, said control information is provided by calculating an average value or a weighted average value of two or more temperature information of different sensor elements. Thereby a mean temperature value of the piece of cookware placed on the cooking surface can be derived.

According to an embodiment, said control entity provides analog to digital (A/D-) conversion of temperature information. More in detail, said control entity may comprise a single input port which is coupled with the electrical circuit. Said single input port provides A/D-conversion properties in order to digitalize the temperature information provided by the sensor elements.

According to an embodiment, said control entity checks plausibility of temperature information provided by the sensor elements and discards temperature information provided by a sensor element with a failed plausibility check result. For example, said plausibility check capabilities may exclude information provided by a certain sensor element and/or control said switching means such that a defective sensor element is not coupled with the control entity any more.

The term “essentially” or “approximately” as used in the invention means deviations from the exact value by +/−10%, preferably by +/−5% and/or deviations in the form of changes that are insignificant for the function.

It is known in the art that such household cooking hobs or cooking appliances usually are provided for conducting at least one cooking process comprising heating and/or cooling step, respectively. Such cooking process preferably at least comprises a heating step, e.g. frying, boiling, simmering or pouching of a foodstuff or a cooking liquid, respectively. For supporting the foodstuff or cookware item, it is particularly known to provide a cooking support, for example in the form of a cooking surface. Such cooking surface usually provides a support for the cookware items, for example, provided in the form of a plate element, particularly a glass or glass ceramic plate.

Preferably, the cooking hob comprises, preferably consists of, a cooking support and a lower casing. Thereby it is preferred that an open top side of the lower casing is covered by at least a part of the cooking support. The cooking support may be provided particularly as at least one panel, wherein preferably the panel is a glass ceramic panel. Preferably, at least one or more heating power transferring elements are arranged beneath the panel.

The lower casing may be manufactured from different material comprising plastics or metal, e.g. aluminum.

In particular, such casing may include a bottom wall and at least one sidewall. It is preferred that said casing is made of metal, e.g. aluminium or steel, and/or plastics, wherein preferably the casing made of metal is grounded.

Advantageously said lower casing may comprise at least one heating power energy unit, particularly arranged in a respective heating power energy unit housing, the heating power transferring elements, heating power transferring element carrier or heating power transferring element support. In other words, the lower casing and the cooking support may form a closed unit comprising all essential parts of the cooking hob. Thereby the lower casing may comprise fastening means for fastening and/or arranging the cooking hob on top of or in a cutout of a work plate.

Thereby, preferably, a power transferring element may be arranged below a cooking support. Preferably, the one or more heating power transferring elements are arranged in an upper portion of the lower casing of the cooking hob. A power transferring element may be arranged and supported by one or more heating power transferring element carrier or heating power transferring element support, preferably the power transferring element attached and/or arranged on said carrier or support. A housing comprising an energy power unit may be arranged below one or more heating power transferring element carrier or heating power transferring element supports. Thereby, preferably a heating power transferring element carrier or heating power transferring element support with the supported heating power-transferring element may advantageously be arranged on top of and/or attached to such housing of an energy power unit.

For conducting the cooking process, particularly a heating step, a cooking appliance, particularly the lower casing, comprises at least one heating power-transferring element. Said heating power-transferring element is provided for transferring heating power to the foodstuff or cooking liquid, preferably contained in a cookware item or piece of cookware.

Preferably, the at least one heating power transferring element is an electric heating element, in particular an induction heating element, particularly induction coil, and/or radiant heating element. The heating power provided by a heating power-transferring element may be preferably provided electrically. Preferably, the heating power may be provided by a heat-generating magnetic field, more particularly an induction field. Accordingly, the cooking hob of the present invention preferably is an induction hob.

Preferably, a heating power-transferring element in the form of an induction coil comprises a planar conductive winding wire, particularly a copper wire. Preferably, an induction coil comprises at least one magnetic field supporting element, e.g. a ferrite element. Preferably, said at least one magnetic field supporting element, particularly at least one ferrite element, is arranged below the plane of the conductive winding wire. Said at least one magnetic field supporting element, particularly ferrite element, is advantageous in establishing and/or supporting the high frequent alternating magnetic field of the induction coil. Said magnetic field supporting element, particularly if arranged below the conductive winding wire, may be glued to or supported by ferrite support elements, e.g. snap fit connectors or the like.

Preferably, an induction coil comprises a shielding element, e.g. a mica sheet. The shielding element preferably is adapted to the form of the planar conductive winding wire or the form of at least two planar conductive winding wires of at least two adjacently arranged coils. The shielding element preferably is provided above the at least one magnetic field supporting element, particularly at least one ferrite element. The shielding element preferably in its main function is a support for the planar conductive wire windings of the coil. However, additionally the shielding element, particularly mica sheet, may also shield temperature radiated from the above, e.g. resulting from a heated up pot bottom.

In the cooking hob of the present invention the at least one heating power transferring element is preferably arranged and/or mounted on a heating power transferring element carrier or heating power transferring element support, particularly comprised in the lower casing. It is particularly preferred that a carrier made of aluminum sheet metal supports the heating power-transferring element. Particularly, the cooking hob of the present invention may comprise power transferring element carrier or heating power transferring element support to support one heating power transferring element, however, it is also considered herein that one power transferring element carrier or heating power transferring element support is provided to support more than one heating power transferring element.

In a preferred embodiment of the present invention, two heating power transferring elements are arranged on and supported by one common heating power transferring element carrier. Particularly at least two induction coils are arranged on and supported by one common induction coil carrier plate.

The heating power transferring element carrier or heating power transferring element support may be advantageously supported by or on a housing of the heating energy power unit.

Particularly, at least one of, preferably all of, the heating power transferring elements of an cooking hob of the invention, more particularly an induction coil of an induction hob, may be arranged below a cooking support, particularly a cooking surface in form of a plate element, and particularly within the lower casing, in order to provide the heat for a heating step to a heating zone of the cooking support and to the bottom side of a cookware item and foodstuff, respectively, when placed on said heating zone.

A cooking support of a cooking hob of the invention, particularly of an induction hob of the invention, preferably comprises at least one heating zone. Such heating zone as referred to herein, preferably refers to a portion of the cooking support, particularly cooking surface, which is associated with one heating power transferring element, e.g. a radiant heating element or an induction coil, which is arranged at, preferably below, the cooking support, e.g. the glass ceramic plate. Particularly, in an embodiment according to which the cooking hob of the present invention is an induction hob, it is preferred that such heating zone refers to a portion of the cooking support, which is associated with at least one induction coil. Thereby, the heating power transferring elements associated with a heating zone are preferably configured such that the same heating power of the associated heating power transferring elements is transferred to the heating zone. Preferably, the heating zone thus refers to a portion of the cooking support to which the same heating power of the associated at least one heating power transferring element is transferred.

In addition, the cooking hob of the present invention, may particularly be configured such that in one operation mode one or more than one heating zones form one cooking zone and/or are combined to one cooking zone, respectively. A cooking zone may be particularly provided as at least a portion of the cooking surface. Particularly, such cooking zone is associated with at least one heating zone. Additionally, or alternatively, a cooking zone may be associated with more than one heating zone. Particularly, a cooking zone may be associated with an even number, particularly two, four, six, eight or ten, more particularly two, heating zones. Alternatively, a cooking zone may be associated with an uneven number, particularly three, five, seven or nine, more particularly three, heating zones.

Preferably, the cooking hob of the present invention is configured such that a cooking zone comprises one or more than one heating zones, which can be driven with the same or different power, frequency or heating level.

In the present invention, it is preferred that in at least one operation mode of the cooking hob according to the present invention is configured such that a cooking zone comprises at least two, preferably two, heating zones, driven by the same power, frequency or heating level. Particularly, such cooking zone comprises or is associated with at least two, preferably two, heating power-transferring elements.

Additionally, or alternatively, the cooking hob of the present invention may be configured such that the number of heating zones associated with one cooking zone may vary and/or may be adjustable dependent on the needs of the cook and/or the size, form or kind of cookware placed on the cooking surface.

Preferably the cooking hob may be configured to adaptively form cooking zones by combining two or more heating zones, i.e. adaptively activate two or more heating power transferring elements in order to heat a certain piece of cookware. Said heating power transferring elements may be arranged in a matrix-like configuration. For example, the cooking hob may comprise multiple heating power transferring elements arranged in multiple rows and columns. Cookware detection means may be provided in order to determine the size of the cookware and group multiple heating power transferring elements in order to from a common cooking zone.

Particularly, a cooking hob according to the present invention, preferably an electric hob, such as an induction hob, may comprise at least one heating power energy unit. A heating power energy unit as used herein, preferably provides energy to at least one of, preferable a number of, the heating power transferring elements such that the heating power transferring element is capable of transferring heating power for heating up the foodstuff or cooking liquid. A heating power energy unit of an induction hob, for example, may provide energy in the form of a high frequency alternating current to a heating power-transferring element in the form of an induction coil, which transfers heating power in the form of a magnetic field to a suitable cookware item. For such purpose, a heating power energy unit may comprise at least one associated power circuit mounted and/or arranged on at least one printed circuit board. Preferably, a heating power energy unit is supported and arranged in a housing, preferably a plastic housing, preferably arrangable in and adapted to the lower casing. This allows easy manufacturing and modularization.

Particularly, the housing may comprise supporting elements for supporting the heating power transferring element carrier or heating power transferring element support. Particularly, such supporting elements may comprise elastic means, e.g. springs or silicon elements, for elastically supporting the heating power transferring element carrier or heating power transferring element support, and particularly advantageous in pressing a heating power-transferring element onto the bottom surface of the cooking support plate, which particularly is a glass ceramic plate.

Particularly, the heating power energy unit, and particularly the associated power circuit, may be configured to be connected to at least one, preferably two phases of a mains supply. A cooking hob according to the present invention thereby comprises at least one, preferably two or three heating power energy units, connected to one or two, preferably one phases of the mains supply each.

Multiple heating power transferring elements of a common heating zone which may be powered by different heating power energy units, said heating power energy units being powered by different phases. So, in other words, different groups of heating power transferring elements (each group comprising one or more heating power transferring elements) are powered by different phases. Alternatively, the heating power energy units may be powered by the same phase. The heating power energy units, specifically induction coils may be powered by an AC-current comprising a frequency in the range of 25 kHz to 100 kHz.

Preferably, a heating power energy unit may comprise at least—one associated power circuit, particularly in the form of an at least one heating power generator, for generating heating power and supplying heating power-transferring elements with heating power, particularly for providing heating power to the at least one heating zone. Thereby the power circuit particularly may be provided in the form of a half-bridge configuration or a quasi-resonant configuration.

It will be immediately understood that the heating power energy unit may thus comprise one heating power generator for providing heating power to more than one heating zone, each associated with at least one heating power transferring element.

Furthermore, the heating power energy unit may comprise one heating power generator comprising a single or pair of high frequency switching elements.

In particular, the high frequency switching element is provided in the form of a semiconductor-switching element, particularly an IGBT element.

In case the heating power energy unit may comprise one heating power generator comprising a single high frequency switching element, the single switching element preferably forms part of associated power circuit, provided in the form of a or a part of a Quasi Resonant circuit.

In case that the heating power energy unit may comprise one heating generator comprises a pair of high frequency switching elements, said pair of high frequency switching elements preferably forms part of an associated power circuit, provided in the form of a or a part of a half-bridge circuit.

A person skilled in the art will immediately understand that the heat, generated by and/or radiated from particularly the heating power transferring elements, the heating power energy unit and/or the cookware item, particularly the bottom thereof, may have also disadvantageous effects, particularly regarding safety and proper functioning. Particularly, the heating power energy unit, more particularly power circuits comprising switching elements, may generate a significant amount of heat being disadvantage for the safety and proper functioning of the cooking hob. For this reason, the cooking hob comprises at least one cooling means. Particularly, said cooling means is adapted for cooling down the electric and/or electronic elements. Particularly, the heating power energy unit may comprise such cooling means. Such cooling means may comprise at least one of a fan, a cooling channel, a cooling body, preferably from a metal, particularly aluminium, cooling air-guiding means, cooling air deflection means and the like. Particularly, the cooking hob of the present invention may comprise such cooling means for cooling at least one heating power generator or a part thereof, particularly to at least one single or pair of high frequency switching elements. More particularly, such cooling means may comprise a cooling body, preferably arranged in the air path of a cooling fan, and thermally connected to at least one heating power generator or a part thereof, particularly to at least one single or pair of high frequency switching elements. Thereby it is preferred that the cooling means comprises at least one fan for generating an air stream through the cooling channel. Preferably, the cooling channel and/or cooling body extends horizontally through the cooking hob. For example, the cooling channel and/or cooling body extends over a substantial part of the horizontal width of the cooking hob.

The cooking hob according to the present invention preferably further comprises a control unit, in the following also referred to as control entity. Such control unit is preferably operatively connected with the heating power energy unit to control at least one operational parameter of the cooking hob, particularly an operational parameter of the heating power energy unit. Furthermore, the control unit comprises a user interface at least for receiving a command input of a user. This advantageously allows the user to control at least one operational parameter of the cooking hob, particularly an operational parameter of the heating power energy unit. Moreover, the control unit, and particularly a user interface if present, may be operatively connected to other appliances or interfaces, e.g. a suction hood, a voice control device, a server, a remote interface, a cloud-computing source or the like.

Accordingly, the household cooking hob according to the present invention comprises at least one electric and/or electronic element. Particularly, said at least one electric and/or electronic element comprises a heating power energy unit and/or control unit or parts thereof.

Particularly, the at least one electric and/or electronic element of the household cooking hob of the present invention may be part of an at least one heating energy power unit, preferably mounted and/or arranged on a power board and/or a power generating circuit mounted on a printed circuit board (PCB).

Such at least one electric and/or electronic element may be, for example, selected from the group comprising a heating power generator, filter coils, EMC filters, rectifier, switching elements, like IGBTs, relays, or the like.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
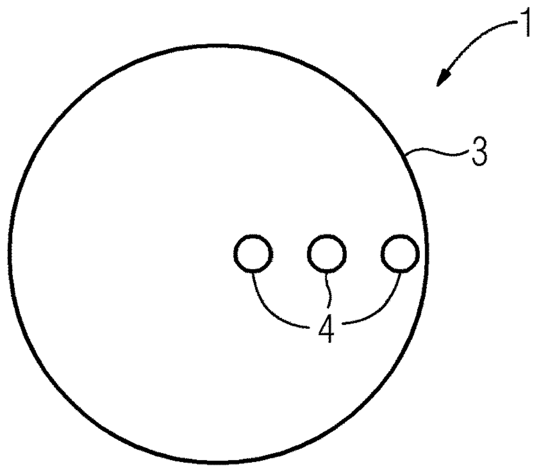
FIG. 1 shows an example top view of a heating zone of an induction heating appliance.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 illustrates a top view of a schematic illustration of an induction heating appliance 1 comprising an induction coil 3 and a set of sensor elements 4. In the present example, three sensor elements 4 are shown. However, the present disclosure should not be considered limited to such number of sensor elements. In general, the induction heating appliance 1 may comprise two or more sensor elements 4. The sensor elements 4 are associated with the induction coil 3 such that all sensor elements 4 are distributed over an area covered by the induction coil 3. More specifically, the sensor elements 4 may be arranged at different radial distances with respect to the centre of the induction coil 3. As shown in the present example, the sensor elements 4 may be arranged on a single radial line with respect to the circular shape of the induction coil 3. However, also other arrangements, specifically arrangements of the sensor elements 4 at different radial positions may be possible.

The sensor elements 4 may be temperature sensor elements like thermistors or NTC-type sensor elements. However, also other sensor element types may be possible.

Figure 2:
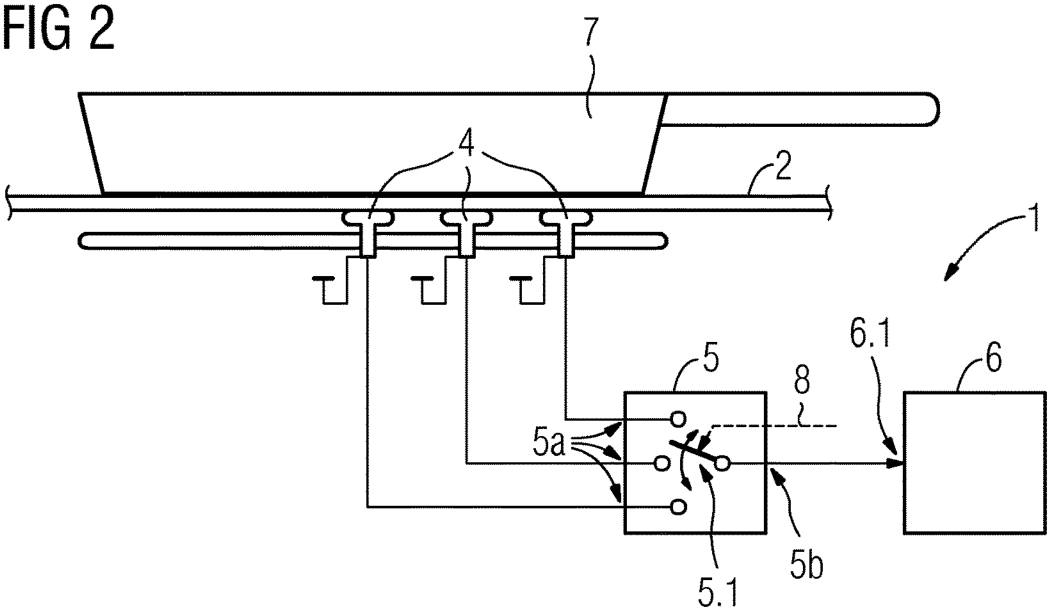
FIG. 2 shows an example cross-sectional view of a piece of cookware placed on an induction heating appliance.

FIG. 2 shows a schematic block diagram of an induction heating appliance 1. The induction heating appliance 1 comprises a cooking surface 2 for receiving a piece of cookware 7. The cooking surface 2 may be built by a glass-ceramic element.

Below the cooking surface 2, an induction coil 3 and the set of sensor elements 4 are provided. Each sensor element 4 may be adapted to operate independent of the other sensor elements 4. Each sensor element 4 may be adapted to gather information regarding the temperature of the piece of cookware 7 placed above the respective sensor element 4. More specifically, each sensor element 4 may be adapted to gather local temperature information in the area in which said sensor element 4 is located. Due to the spatial distribution of the sensor element 4, temperature information in different areas of the piece of cookware 7 can be gathered.

The sensor elements 4 are electrically coupled with an electrical circuit 5 in order to transfer information provided by the sensor elements 4 to the electrical circuit 5.

As shown in FIG. 2, the electrical circuit 5 may comprise multiple input ports 5*a*, wherein each input port 5*a* is electrically coupled with one of said sensor elements 4. In addition, the electrical circuit 5 comprises an output port 5*b*, specifically a single output port 5*b* which is associated with said input ports 5*a*.

In order to electrically couple one of said input ports 5*a* with the output port 5*b*, the electrical circuit 5 comprises switching means 5.1. The switching means 5.1 may comprise one or more electromechanical switches, electronic switching means like transistor etc. and/or a multiplexer, for example an analog multiplexer, specifically a solid state analog multiplexer. Based on said switching means it is possible to provide temperature information gathered by a certain sensor element 4 at the output port 5*b* of the electrical circuit 5.

In addition, the electrical circuit 5 may be adapted to modify the electrical signal provided by the sensor element 4. For example, the electrical circuit 5 may change the voltage level of the electrical signal provided by the sensor elements to a voltage level required by a control entity 6 receiving and evaluating said electrical signal from the electrical circuit 5 (voltage level adjustment).

The electrical circuit 5 may be coupled with a control entity 6. More in detail, the control entity 6 may comprise an electrical input port 6.1 which is electrically coupled with the output port of the output port 5*b* of the electrical circuit 5. The input port 6.1 may be adapted to receive an analog signal and convert said analog signal into the digital domain. In other words, the input port 6.1 may be the input of an analog to digital (A/D-) converter of the control entity 6. So, depending on the switching state of the switching means 6.1 of the control entity 6, the control entity 6 receives analog information, specifically one or more analog voltage values of one of said sensor elements 4. Said analog information is transformed into digital information and processed by the control entity 6 in order to control the induction heating appliance 1.

Said control of the induction heating appliance 1 may be performed such that the induction coil 3 is activated/deactivated depending on the temperature information provided by the one or more sensor elements 4.

For example, the control entity 6 may be adapted to compare said temperature information with a target value (e.g. specified by the heating level chosen by the user of the appliance 1) and switch the power provision to the induction coil 3 on if the temperature information is below said target value, respectively, switch the power provision to the induction coil 3 off if the temperature information is above or crosses said target value.

The control entity 6 may be configured to control the switching state of the switching means 5.1 in order influence which sensor element 4 is electrically coupled with the control entity 6. The control entity 6 may be coupled with the electrical circuit 5 via a control line 8 in order to provide control information to the electrical circuit 5.

The control entity 6 may control the switching means 5.1 such that one of said sensor elements 4 is selectively coupled with the input port 6.1 of the control entity 6. More in detail, the control entity 6 may control the switching means 5.1 such that temperature information of different sensor elements 4 are subsequently provided to the control entity 6. So, in other words, at least some of the sensor elements 4 may provide their temperature information to the control entity 6 in consecutive time periods. Thereby, the control entity 6 receives temperature information from different areas of the piece of cookware 7 thereby being able to provide an improved temperature control.

The control entity 6 may be configured to process temperature information provided by different sensor elements 4 in order to obtain more sophisticated control information. For example, the control entity 6 may calculate an average value based on multiple temperature information. Said calculation may be an unweighted or weighted average calculation. Also other kind of information processing is possible.

The control entity 6 may comprise a fault detection routine for detecting sensor elements 4 providing conspicuous temperature information. For example, if the temperature information provided by one of said sensor elements 4 is significantly different to the temperature information provided by the other sensor elements 4, the control entity 6 may be adapted to discard said conspicuous temperature information. Alternatively, the control entity 6 may control the switching means 5.1 such that the error-prone sensor element 4 is not sampled any more.

Figure 3:
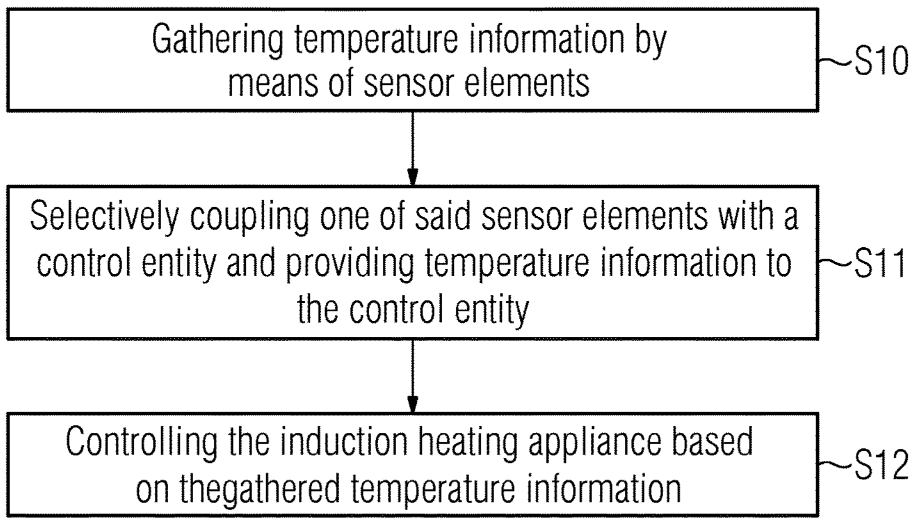
FIG. 3 shows a block diagram illustrating method steps for operating an induction heating appliance.

FIG. 3 shows a block diagram of a method for controlling an induction heating appliance 1.

As a first step, temperature information is gathered by means of multiple sensor elements 4 (S10).

In order to provide said temperature information to a control entity providing control of the induction heating appliance 1, one of said sensor elements 4 is selectively coupled with a control entity (S11).

Finally, the control of the induction appliance 1, specifically, the powering of the induction coil 3 is performed based on information received from at least some of the sensor elements 4 (S12).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 induction heating appliance
2 cooking surface
3 induction coil
4 sensor element

5 electrical circuit
5*a* input port
5*b* output port
5.1 switching means
6 control entity
6.1 input port
7 piece of cookware
8 control line

The invention claimed is:

1. A method for controlling a cooking hob, the cooking hob comprising a cooking surface, a heating power transferring element provided below the cooking surface, and two or more sensor elements arranged below the cooking surface and associated with the heating power transferring element, the method comprising the steps of:

gathering temperature information by said two or more sensor elements;

selectively coupling one of said two or more sensor elements with a control entity in order to provide gathered temperature information to said control entity; and controlling the cooking hob based on the gathered temperature information.

2. The method according to claim 1, wherein the step of selectively coupling one of said two or more sensor elements with the control entity comprises electrically coupling a first sensor element of said two or more sensor elements with the control entity, and performing a switching operation thereby decoupling the first sensor element from the control entity and coupling a second sensor element of said two or more sensor elements with the control entity.

3. The method according to claim 1, wherein the step of selectively coupling one of said two or more sensor elements with the control entity comprises consecutively coupling different ones of said two or more sensor elements to a single electrical input of the control entity.

4. The method according to claim 1, wherein the control entity controls the selective coupling of one of the two or more sensor elements with the control entity.

5. The method according to claim 1, wherein the control entity receives the gathered temperature information from multiple different ones of said two or more sensor elements and calculates control information based on said gathered temperature information from the different ones of said two or more sensor elements.

6. The method according to claim 5, wherein said control information is provided by calculating an average value or a weighted average value of the gathered temperature information from two or more of said different ones of said two or more sensor elements.

7. The method according to claim 1, wherein said control entity provides analog to digital conversion of the gathered temperature information.

8. The method according to claim 1, wherein said control entity checks plausibility of the gathered temperature information provided by the two or more sensor elements and discards such temperature information provided by a said sensor element with a failed plausibility check result.

9. The method according to claim 1, wherein the cooking hob includes an electrical circuit with switching means for providing a selective electrical coupling of one of said two or more sensor elements with the control entity.

10. The method according to claim 9, wherein the electrical circuit provides a selective electrical coupling of said one of said two or more sensor elements with a single input of the control entity.

11. The method according to claim 10, wherein the single input of the control entity is an A/D-converter input of the control entity.

12. The method according to claim 9, wherein the control entity provides control information to the electrical circuit in order to control which of said two or more sensor elements is electrically coupled with the control entity.

13. The method according to claim 1, wherein the control entity is configured to calculate control information based on the temperature information gathered by at least two of said two or more sensor elements.

14. The method according to claim 9, wherein the electrical circuit is configured to adjust a voltage provided by the two or more sensor elements to a voltage level required by the control entity.

15. The method according to claim 9, wherein said switching means comprises an element selected from a group consisting of:

an electromechanical switch, a transistor, and a multiplexer.

16. The method according to claim 9, wherein:

each of the two or more sensor elements is electrically coupled to a respective sensor input of the electrical circuit, the switching means of said electrical circuit being configured to selectively establish electrical communication one at a time between each said respective sensor input and an output of said electrical circuit, the control entity includes a control input that is electrically coupled to said output for receiving temperature signals from the two or more sensor elements, said control entity being adapted to operate said switching means in order to successively establish electrical communication between each respective sensor input and the output of said electrical circuit so that temperature signals from the two or more sensor elements are transmitted successively and individually to the control entity reflective of respective local temperatures associated with each one of the sensing elements, the control entity being further adapted to process respective temperature signals received from respective ones of the two or more sensor elements and based thereon to operate said heating power transferring element.

17. The method according to claim 16, said heating power transferring element comprising an induction coil, said electrical circuit being further adapted to modify the respective temperature signals received from the respective ones of the two or more sensor elements to adjust a voltage level prior to transmitting said respective temperature signals to the control entity.

18. The method according to claim 9, said control entity being adapted to run a fault detection routine configured to detect conspicuous temperature signals from said two or more sensor elements, and to discard such conspicuous temperature signals and/or to operate the switching means so that a sensor element of the two or more sensor elements that supplied the conspicuous temperature signals is not sampled anymore by the control entity.

* * * * *